March 6, 1928. 1,661,621

H. PIEPER

BRAKE MECHANISM

Filed April 15, 1926    3 Sheets-Sheet 2

Inventor:
Henri Pieper
By
Attorney.

March 6, 1928.  H. PIEPER  1,661,621
BRAKE MECHANISM
Filed April 15, 1926  3 Sheets-Sheet 3
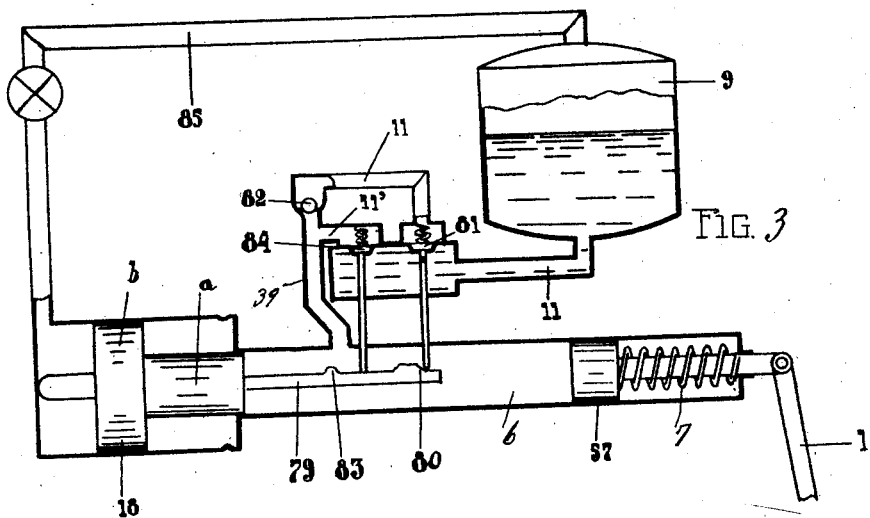
Fig. 3
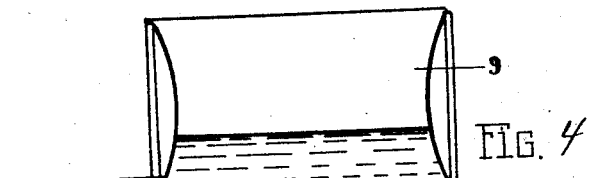
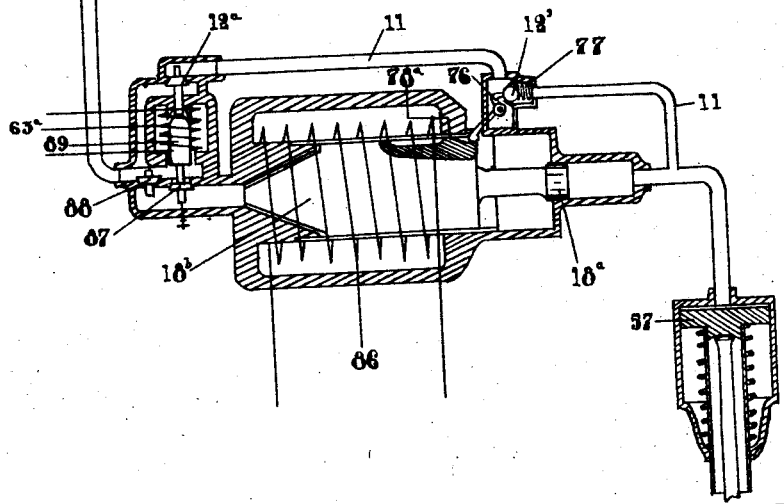
Fig. 4
Inventor:
Henri Pieper
By [signature]
Attorney Patented Mar. 6, 1928.

1,661,621

UNITED STATES PATENT OFFICE.

HENRI PIEPER, OF BRUSSELS, BELGIUM, ASSIGNOR TO COMPAGNIE INTERNATIONALE DES FREINS AUTOMATIQUES, SOCIETE ANONYME, OF LIEGE, BELGIUM.

BRAKE MECHANISM.

Application filed April 15, 1926, Serial No. 102,180, and in Belgium September 10, 1925.

The invention relates to a brake installation in which an intermediate liquid is employed in order to withstand the reaction the brake mechanism undergoes when the shoes are pressed against the wheels; this reaction, which is communicated to the liquid by a piston connected to the brake mechanism, being transmitted either to the frame or to a piston upon which the braking force is exerted.

In order to regulate automatically the distance which exists in the releasing position between the shoes and the wheel, the invention provides means whereby the shoes are applied against the wheels after a predetermined movement of the working member; the supplementary movement being utilized for obtaining the braking action.

These means may be such that as soon as the braking operation has commenced, liquid is introduced into the space in which the piston connected to the brake mechanism moves in order that the shoes may be immediately pressed against the wheels, after which, this liquid being capable of displacement in certain ducts, the above predetermined movement of the working member is produced without exerting a braking action, this last being only commenced when the said ducts are closed after the predetermined stroke or movement has been effected.

These ducts are closed during the whole of the releasing stroke so that the space between the shoes and the wheels obtained at release of the brakes always corresponds to the above predetermined movement.

Each of the figures shown in the accompanying drawings represents, by way of example, one form of the invention.

Fig. 3 illustrates a modification in which several mechanically-controlled valves effect communication with the pressure reservoir;

Fig. 4 shows another modification in which the several valves, for the most part, are controlled electrically.

Figure 1:
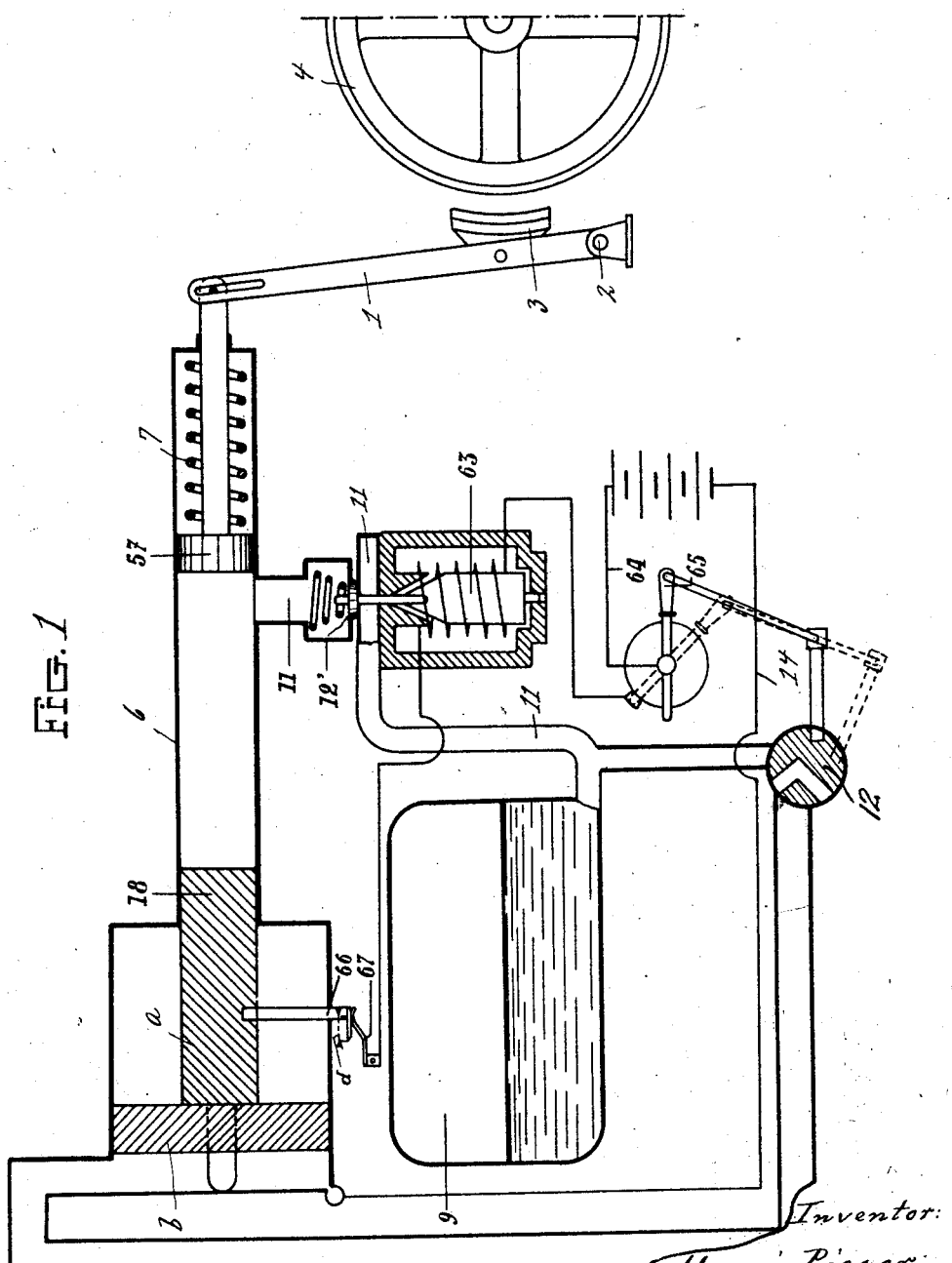
Figure 1 is a diagrammatic view of a construction embodying a single electrically-controlled valve.

In the construction shown in Figure 1 the space 6 comprised between the pistons 18 and 57 may be connected by a duct 11 with a reservoir 9 containing liquid under pressure; in this duct 11 is placed a valve 12' normally applied upon its seating by a spring the stem of which valve is fixed to the core 63 of a solenoid. This solenoid is interposed in an electric circuit 64 which may be broken at two points, that is to say by the displacement of the handle 65 of a controller which must occupy the position indicated in dotted lines in order to close the circuit and at another point by the displacement of the pin 66 carried by the piston 18 until it is no longer in engagement with the fixed contact 67, the result of which is to break the circuit.

The handle 65 of the controller is connected to operate a valve 12 included in a duct or passage leading from reservoir 9 to a point back of piston 18, so that when it occupies the position shown in dotted lines, not only is the electric circuit 64 closed but said valve 12 is opened and fluid under pressure acting to move piston 18 to the right may be admitted behind the piston at the same time or a little later.

It also results that as soon as the handle 65 is brought into the position shown in dotted lines, the valve 12' rises by the action of the solenoid, admitting to the space 6 comprised between the pistons 18 and 57 liquid under pressure which forces immediately the piston 57 towards the right, thus rocking the brake lever 1 in the same direction and applying the shoe 3 against the wheel 4; at the same time the piston 18 continues its movement to the right and the liquid ahead of it in the space 6 is thus forced back into the reservoir 9, this back flow continuing until the valve 12' is closed which takes place when the contact is broken between the members 66 and 67 after a predetermined stroke of the piston 18. This stroke will be equal to the distance $d$ and will have no effect on the braking proper; this last being effected afterwards by a new displacement of the piston 18 to the right.

The releasing of the brakes is obtained by putting the handle 65 in the position shown in full lines so that the piston 18 may be brought back into the initial position shown in the figure by the action of an appropriate means not shown, the piston 57 coming back, automatically under the action of the return spring 7 of the braking mechanism.

During this return movement of piston 18 the circuit 64 will not close notwithstanding the reengagement of contacts 66 and 67, because it will be broken by displacement of the handle 65 of the controller; the valve 12', therefore, will remain closed and the shoe 3 can be drawn from the wheel a distance proportional to the distance $d$ corresponding to the predetermined stroke accomplished by the piston 18 when the valve 12 was opened.

Figure 2:
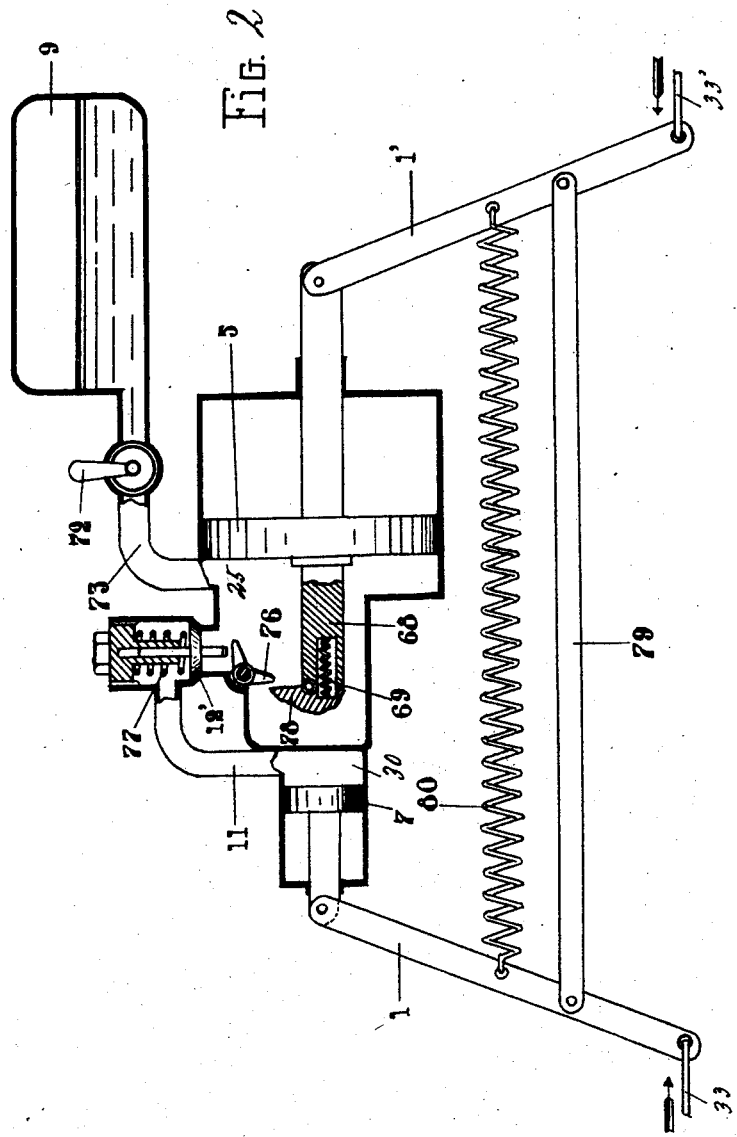
Fig. 2 is a similar view of a construction in which the single valve is controlled mechanically.

The arrangement shown in Figure 2 obtains the same result by a mechanical control.

For this purpose the counter-rod 68 of the piston 5 is provided at its end with a pivoted catch 78 which is normally maintained in the position shown in the drawings by a spring 69.

When the handle 72 controlling the valve provided upon the duct 73 connecting the reservoir 9 with the space 25 in which the piston 5 moves is brought into its opening position, liquid under pressure from the reservoir 9 acts on the piston 5 and displaces it to the right, thus rocking the bell-crank lever 76 by the action of the catch 78 which hits one arm of the bell-crank; the other arm effecting the opening of valve 12' controlled by spring 77. The opening of this valve permits the liquid under pressure to pass into the duct 11 and be delivered thereby into the cylinder 30 in which moves the piston 57 the rod of which is articulated on the lever 1 connected by link 33 to the brake mechanism; the rod of the piston 5 is articulated on the lever 1' also connected by link 33' to the brake mechanism, the levers 1 and 1' being connected together by rod 79 and by a spring 80, so that the braking action will take place when the levers 1 and 1' are displaced in the directions of the arrows.

The length of the nose of the catch 78 and also the arm of the bell-crank 76 against which it acts will be such that when the piston 5 is being displaced to the right, the valve 12' remains open during a certain stroke during which the liquid under pressure may act on the piston 57 in order to press the shoes, not shown, against the wheel. The valve then continues to remain open and the piston 5 continues to move to the right, displacing the lever 1' connected to it and causing said lever to exert a traction action on spring 80. The said piston 5 having a much larger surface than piston 57, the effort which it receives is much greater than that received by piston 57, so that the latter will be moved to the right by the pull exerted on its lever 1 by spring 80, thereby forcing back the liquid through the valve 12' into the space 25 wherein piston 5 moves.

The valve 12' then closes and piston 5 continues its stroke to the right in order to exert the desired braking action.

When the releasing of the brakes is effected by an appropriate means not shown, the piston 5 moves back to the left and the catch 78 takes up again its position against the bell-crank lever 76 by passing under this so that at the moment of the releasing of the brakes the valve 12' will not be open. The piston 57 will remain in the position into which it was brought.

The space between the shoes and the wheels necessary for complete release of the brakes will thus approximately correspond to the stroke effected by the piston 5 when the applying movement takes place and during opening of the valve 12'.

It goes without saying that the tension of the spring 77 must be higher than the maximum braking pressure existing in the space 25 in which moves the piston 5.

The construction shown in the Figure 3 likewise includes a lever 1 for connection to the brake mechanism, and a piston 57 guided in a cylinder 6, the other end of which is closed by a differential piston 18. The part $a$ of this differential piston has secured to it an axial rod 79 including a cam member 80 which at the beginning of the displacement of the piston 18 raises the stem of a spring valve 81 arranged in the duct 11 leading from the reservoir 9 and connected by an extension 39 to the cylinder 6 in which the pistons move; duct 11 being also controlled by an automatic valve 82. This arrangement, which is based on the same principle as that shown in Figure 1, will therefore permit the liquid to be forced back from the cylinder to the reservoir 9 and will also permit in any case a certain displacement of the piston 18 producing no braking effort.

When the cam 80 has almost disengaged the rod of the valve 81, or has passed beyond it, a second cam 83 on rod 79 will raise the rod of a spring-pressed valve 84 arranged in a branch 11' of duct 11, thereby short-circuiting the valves 81 and 82.

The operation is substantially as follows: When the differential piston 18 moves to the right, the cam 80 on its rod 79 engages the stem of rod 81 and opens it, whereupon the pressure liquid enters the upper portion of duct 11 but cannot pass therefrom to the space or cylinder 6 because valve 82 is closed. During the movement of said piston, the pressure of the liquid contained in space 6 increases and can become high enough to apply the brakes, at which point it almost balances the pressure in reservoir 9. But if it tends to exceed that pressure, then the liquid in said space will be forced back into the reservoir through the automatic valve 82 and the then open valve 81. At the moment when the cam 83 on rod 79 engages the rod of valve 84, the rod of valve 81 will leave cam 80 and said valve 81 will close and valve 84 will open. If the pressure in space 6 stays less than that in reservoir 9, then the liquid in said reservoir will pass into said space and will act on piston 57 in such a way as to apply the shoes against the wheels. After the rod of valve 84 leaves cam 83, the braking proper takes place.

In the construction shown, liquid under pressure for actuating the differential piston will be supplied behind its larger member $b$ from the reservoir 9 by a duct 85 equipped with a suitable valve. The automatic valve 82 may, if desired, be replaced by a valve similar to valve 84 and having its stem or rod operable by cam 83, in which event valve 84 and duct 11' will be omitted.

Figure 4 concerns a modification in which the duct 11 connecting the reservoir 9 and the braking cylinder in which moves the piston 57 is controlled conjointly by a valve $12^a$ operated by the core 89 of a small solenoid $63^a$ which controls the braking force, and by a second valve 12' interposed in the same conduit and which is controlled by the displacement of the member $18^b$ of the differential piston.

In the construction shown, the solenoid core also operates a valve 87 controlling the braking force. Besides, the releasing of the brakes is effected by the action of a large solenoid 86 which brings back the differential piston and forces back liquid under pressure into the reservoir 9 through the valve 88.

The position of the parts shown in the figure corresponds to the releasing of the brakes. In order to apply the brakes, current is shut off from the small solenoid $63^a$. The core member 89 is then displaced and also the valves $12^a$ and 87 which are opened. Liquid under pressure acts on the piston $18^b$ which is moved to the right and immediately rocks the bell-crank 76, thereby opening valve 12' against the action of spring 77. The liquid under pressure is then directly delivered by the duct 11 into the cylinder in which the piston 57 moves so that the brakes are immediately applied. The valve 12' remains open as long as its cam $78^a$ is in contact with the bell-crank 76. When those parts are separated the real braking effort begins. At the moment of release which is effected by energizing the solenoid 86 the valve $12^a$ is not opened for the reason that the solenoid $63^a$ is then also energized.

What I claim is:

1. A brake mechanism comprising a cylinder filled with liquid, a piston moving in said cylinder and connected to the brakes; a brakes control device acting upon said liquid, means under tension for automatically applying the brakes, and means for controlling the entry into action of the first named means by the first movement of the brakes control device when displaced in the direction corresponding to braking, and for terminating such action after the completion of a predetermined stroke of the said control device.

2. A brake mechanism comprising a cylinder filled with liquid, a piston moving in said cylinder and connected to the brakes, a brakes control device acting upon said liquid, a chamber containing liquid surmounted by a gas under pressure, a valve controlled communication between said chamber and said cylinder, and means for opening such communication by the first movement of the brakes control device, when displaced in the direction corresponding to braking, and for closing said communication after the completion of a predetermined stroke of the said control device in braking direction.

3. A brake mechanism comprising a cylinder filled with liquid, a piston moving in said cylinder and connected to the brakes, a brakes control piston acting upon said liquid and actuated to apply and release the brakes, a chamber containing liquid surmounted by a gas under pressure, a valve controlled communication between said chamber and said cylinder, means for opening the said communication by the first movement of said control piston, and means for closing the said communication after the completion of a predetermined stroke of the control piston and maintaining it closed until the said control piston has been returned to releasing position and again displaced in braking direction.

4. A brake mechanism comprising a cylinder filled with liquid, a piston moving in said cylinder and connected to the brakes, a brakes control piston acting upon said liquid, a chamber containing liquid surmounted by a gas under pressure, a valve controlled communication between said chamber and said cylinder, mechanical means for opening a valve disposed in said communication during the first part of the stroke of said control piston, and means for maintaining said communication closed during the releasing stroke.

5. A brake mechanism comprising a cylinder filled with liquid, a piston moving in said cylinder and connected to the brakes, a brakes control piston acting upon said liquid, a chamber containing liquid surmounted by a gas under pressure, a valve controlled communication between said chamber and said cylinder, mechanical means for opening a valve disposed in said communication during the first part of the stroke of said control piston, a second valve disposed in said duct, and means for maintaining the second valve closed during the releasing stroke.

6. A brake mechanism comprising a cylinder filled with liquid, a piston moving in said cylinder and connected to the brakes, a second cylinder, connected with the first one, a brake control piston moving in the second cylinder, a chamber containing liquid surmounted by a gas under pressure, a communication between said chamber and said cylinders, a valve in said communication positively opened by the second named piston, a second valve disposed in said communication and opening towards said chamber, a third cylinder of greater section than the second one containing a third piston rigidly connected with the second one, and a valve controlled communication between said third cylinder and said chamber.

7. A brake mechanism comprising a cylinder filled with liquid, a piston moving in said cylinder and connected to the brakes, a second cylinder connected with the first one, a brake control piston moving in the second cylinder, a chamber containing liquid surmounted by a gas under pressure, a communication between said chamber and said cylinders, a valve in said communication positively opened by the second named piston, a second valve disposed in said communication and opening towards said chamber, a third cylinder of greater section than the second one, a communication between said third cylinder and said chamber comprising a non-return valve opening towards said chamber and near said non-return valve a valve adapted to open under the gas pressure but maintained on its seat by electrical means which also control the second valve disposed in the communication between the said chamber and the cylinder containing the piston connected to the brakes, and electrical means for displacing the third piston towards the releasing position.

In testimony whereof I affix my signature.

HENRI PIEPER.